US011087414B2

(12) United States Patent
Bastide et al.

(10) Patent No.: US 11,087,414 B2
(45) Date of Patent: *Aug. 10, 2021

(54) DISTANCE-BASED SOCIAL MESSAGE PRUNING (71) Applicant: Airbnb, Inc., San Francisco, CA (US)

(72) Inventors: Paul R. Bastide, Boxford, MA (US); Matthew E. Broomhall, Goffstown, NH (US); Robert E. Loredo, North Miami Beach, FL (US)

(73) Assignee: Airbnb, Inc., San Francisco, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/438,794

(22) Filed: Jun. 12, 2019

(65) Prior Publication Data
US 2019/0295188 A1 Sep. 26, 2019

Related U.S. Application Data (63) Continuation of application No. 15/288,264, filed on Oct. 7, 2016, now Pat. No. 10,360,643.

(51) Int. Cl.
*G06F 16/90* (2019.01)
*G06Q 50/00* (2012.01)
*G06F 16/901* (2019.01)
*G06F 16/9535* (2019.01)
*G06F 16/2455* (2019.01)
*G06F 16/2457* (2019.01)
*G06F 40/10* (2020.01)
*G06F 16/9537* (2019.01)
*G06F 40/205* (2020.01)
(Continued)

(52) U.S. Cl.
CPC ....... *G06Q 50/01* (2013.01); *G06F 16/24568* (2019.01); *G06F 16/24578* (2019.01); *G06F 16/9024* (2019.01); *G06F 16/9535* (2019.01); *G06F 40/10* (2020.01); *G06F 16/9537* (2019.01); *G06F 40/205* (2020.01); *G06N 5/02* (2013.01); *G06Q 10/101* (2013.01)

(58) Field of Classification Search
CPC ............. G06Q 50/01; G06F 16/24568; G06F 16/9535
See application file for complete search history.

(56) References Cited

U.S. PATENT DOCUMENTS 8,141,127 B1  3/2012 Mustafa
8,442,073 B2  5/2013 Skubacz et al.
(Continued)

OTHER PUBLICATIONS

Unknown, "SaneBox for Business," https://www.sanebox.com/business, 4 pgs, printed Sep. 12, 2016.
(Continued)

*Primary Examiner* — Loc Tran
(74) *Attorney, Agent, or Firm* — Schwegman Lundberg & Woessner, P.A.

(57) ABSTRACT

Correspondences in a social networking system are analyzed to determine at least one topic. An activity stream with the at least one topic is analyzed. A target audience for the activity steam is identified. The activity stream is analyzed according to a uniqueness and a relationship criteria to form an assessment. The assessment is analyzed to a predetermined action criteria. Performing an action responsive to determining the assessment satisfies the predetermined action criteria.

14 Claims, 7 Drawing Sheets (51) Int. Cl.
*G06N 5/02* (2006.01)
*G06Q 10/10* (2012.01)

(56) References Cited

U.S. PATENT DOCUMENTS

| | | |
|---|---|---|
| 8,595,234 B2 | 11/2013 | Siripurapu et al. |
| 8,898,698 B2 | 11/2014 | Fleischman et al. |
| 9,143,468 B1 | 9/2015 | Cohen et al. |
| 9,449,050 B1 * | 9/2016 | Molina ............. G06F 16/24575 |
| 9,904,962 B1 | 2/2018 | Bastide et al. |
| 9,928,484 B2 | 3/2018 | Deeter et al. |
| 10,002,127 B2 | 6/2018 | Beckwith et al. |
| 10,204,385 B2 | 2/2019 | Bastide et al. |
| 10,204,386 B2 | 2/2019 | Bastide et al. |
| 2012/0131139 A1 * | 5/2012 | Siripurapu ............. H04L 65/60 709/217 |
| 2013/0110638 A1 | 5/2013 | Ogawa |
| 2014/0006400 A1 | 1/2014 | Bastide et al. |
| 2015/0032707 A1 | 1/2015 | Barykin et al. |
| 2015/0256634 A1 | 9/2015 | Bastide et al. |
| 2016/0034571 A1 | 2/2016 | Setayesh et al. |
| 2016/0070808 A1 | 3/2016 | Imig et al. |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
Bastide et al., "Distance-Based Social Message Pruning," U.S. Appl. No. 15/288,264, filed Oct. 7, 2016.
Bastide et al., "Distance-Based Social Message Pruning," U.S. Appl. No. 15/669,495, filed Aug. 4, 2017.
Bastide et al., "Distance-Based Social Message Pruning," Application No. *, Feb. 20, 2018.
List of IBM Patents or Patent Applications Treated as Related, Dated Jun. 12, 2019, 2 pgs.
Bastide et al., "Distance-Based Social Message Pruning," U.S. Appl. No. 15/899,635, Feb. 20, 2018.
Accelerated Examination Support Document, U.S. Appl. No. 15/669,495, signed Jul. 31, 2017, 17 pgs.
Accelerated Examination Support Document, U.S. Appl. No. 15/899,580, signed Feb. 13, 2018, 20 pgs.

* cited by examiner

DISTANCE-BASED SOCIAL MESSAGE PRUNING

BACKGROUND

The present invention relates generally to the field of data processing, and more particularly to data processing based on a user profile or attribute.

Social media are computer-mediated tools that allow people, companies, and other organizations to create, share, or exchange information, career interests, ideas, and pictures/videos in virtual communities and networks. Social media depend on mobile and web-based technologies to create highly interactive platforms through which individuals, communities, and organizations can share, co-create, discuss, and modify user-generated content. They introduce substantial and pervasive changes to communication between businesses, organizations, communities, and individuals.

SUMMARY

Embodiments of the present invention disclose a method, computer program product, and system for dynamically processing information in an activity stream based on uniqueness and a relationship criteria. Correspondences in a social networking system are analyzed to determine at least one topic. An activity stream with the at least one topic is analyzed. A target audience for the activity steam is identified. The activity stream is analyzed according to a uniqueness and a relationship criteria to form an assessment. The assessment is analyzed to a predetermined action criteria. Performing an action responsive to determining the assessment satisfies the predetermined action criteria.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Social networking systems may be a universal mechanism to connect end users and information in logical and organized manners that may enable sharing and processing of information between the end users. Currently, common mechanisms of sharing and processing information utilize an inbox, wall, activity stream, timeline, or profile. Hereinafter, an activity stream may include, but is not limited to, an instant messaging (IM), short message services (SMS), blog, website, community, news feed, email, Voice over Internet Protocol (VoIP), inbox, wall, timeline, and profile. These mechanisms enable an end user to rapidly share information with other end users, as well as also gather information from the end users in social networking systems, and have also resulted in a rapid increase in the number of correspondence that must be stored. The number of messages sent per day may be on the order of four to five billion emails, tens of millions of photos an hour, a billion messages per day on social media websites, and five hundred million short messages per day. The rapid increase in correspondence results in incredibly large mail files and a personal message data repository where each message may be given substantially similar treatment. The likelihood two coworkers who are working on the same project from ten years ago are still corresponding regarding the past project may be very unlikely. Accordingly, there is a clear value to selectively pruning correspondence within a social networking system. Hereafter, pruning refers to deleting, removing, separating, merging, and/or archiving correspondence(s) within a social networking system.

Therefore, it may be advantageous to, among other things, provide a way to dynamically parse correspondence(s) in a social networking environment, and then determine which portion of the parsed correspondence(s) to prune. The correspondence(s) may be pruned by selecting a primary population of messages within the social network, determining a unique set of attributes for the correspondence(s) of the primary population, analyzing the correspondence(s) of the primary population, establishing generation links between the correspondence(s), and then suggest conversations to be pruned based, at least in part, on the number of established generation links.

A pruning program may be implemented to assist an end user with pruning correspondence(s) within a social network (e.g., a computing environment) by automatically establishing links between correspondence(s) (e.g., messages or text on a wall) within the social networking system. The end user may be a user of the social networking system. The end user may have every message since she joined the social networking system in 2013 (e.g., 120,000 messages in three years collected at a hundred messages a day that amounts to five gigabytes worth of messages). A message administrator of the social networking system may have set a limit of 100,000 messages for the end user. As the end user has 120,000 messages, a threshold relating to the message limit may have been satisfied (e.g., the number of messages saved for the user has exceeded the limit), and the pruning program may be activated in response to the threshold being satisfied. The pruning program may display a prompt for the end user to select her most important messages until she selects a predetermined amount of messages (e.g., 100 messages). The pruning program may group each user selected message into a conversation data element, and then may analyze attributes for the conversation data elements (e.g., users, subject, and natural language). The pruning program may then identify an activity stream (e.g., remaining messages within an inbox), and then analyze the remaining messages for attributes (e.g., users, subject, and natural language) analyzed within and related to the user selected messages. The pruning program may then establish a generation link with the user selected messages to the remaining (e.g., unselected) messages within the activity stream for each overlap in the attributes (e.g., users, subject, and natural language) that may be in the form of a link between two nodes, and a weight of one may be added for each link between a user selected message and an unselected message. The pruning program may suggest a portion of the messages within the social messaging system to prune based on the unlinked correspondence(s) elements. The end user may end up reducing the total messages in her activity stream based on the pruning. The end user may have selected these based on a tree or a graph representing the relationships between conversations that may have been generated and then displayed by the pruning program.

The following described exemplary embodiments provide a system, method, and program product for dynamically pruning social networking systems based on keywords and analyzed data elements within user selected electronic document (e.g., messages) within the social networking system. As such, embodiments of the present disclosure may improve the technical field of data processing by organizing/pruning correspondence within a social networking system according to a linkage between correspondences. More specifically, embodiments may reduce irrelevant correspondences within a social networking system by dynamically pruning correspondences according to content and/or keywords within user selected messages so that a user may reduce wasting resources.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
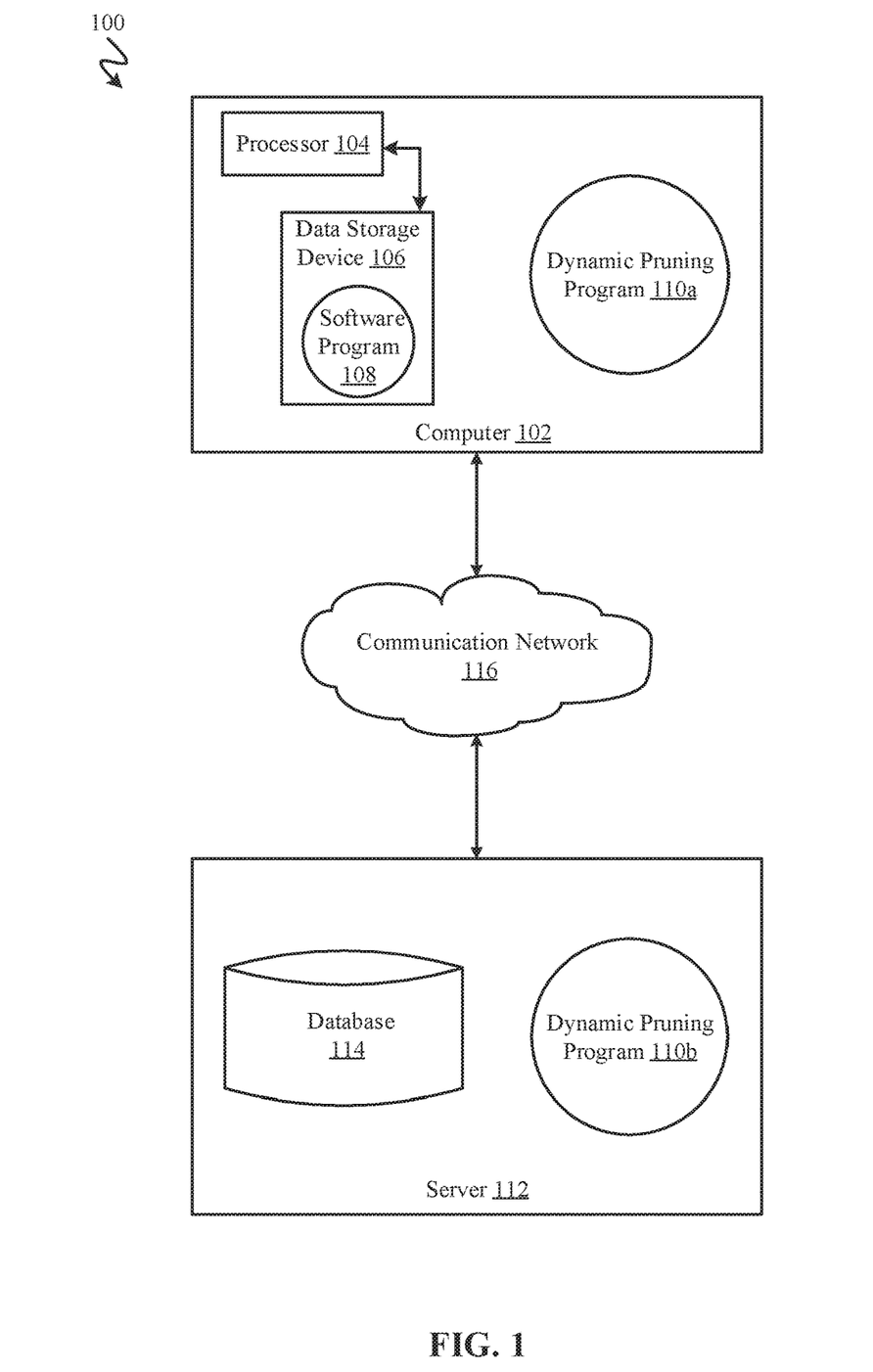
FIG. 1 illustrates a networked computer environment according to at least one embodiment.

Referring to FIG. 1, an exemplary networked computer environment 100 in accordance with at least one embodiment is depicted. The networked computer environment 100 may include a computer 102 with a processor 104 and a data storage device 106 that is enabled to run a software program 108 and a dynamic pruning program 110a. The networked computer environment 100 may also include a server 112 that is enabled to run a dynamic pruning program 110b that may interact with a database 114 and a communication network 116. The networked computer environment 100 may include one or more computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic pruning program 110a, 110b may interact with a database 114 that may be embedded in various storage devices, such as, but not limited to a computer/mobile device 102, a networked server 112, or a cloud storage service. The database 114 can include a repository of any transactions associated or initiated with the dynamic pruning program 110a and 110b. The dynamic pruning program 110a and 110b may be updated in any system associated with the dynamic pruning program 110a and 110b (e.g., database 114).

According to the present embodiment, a user using a client computer 102 or a server computer 112 may use the dynamic pruning program 110a, 110b (respectively) to parse correspondence within a social network system, analyze any activity stream associated with the social networking system according to a uniqueness and/or a relationship criteria to form an assessment, then prune, among other actions, a portion of correspondence(s) associated with the social networking system. The dynamic pruning method is explained in more detail below with respect to FIGS. 2 and 3.

Figure 2:
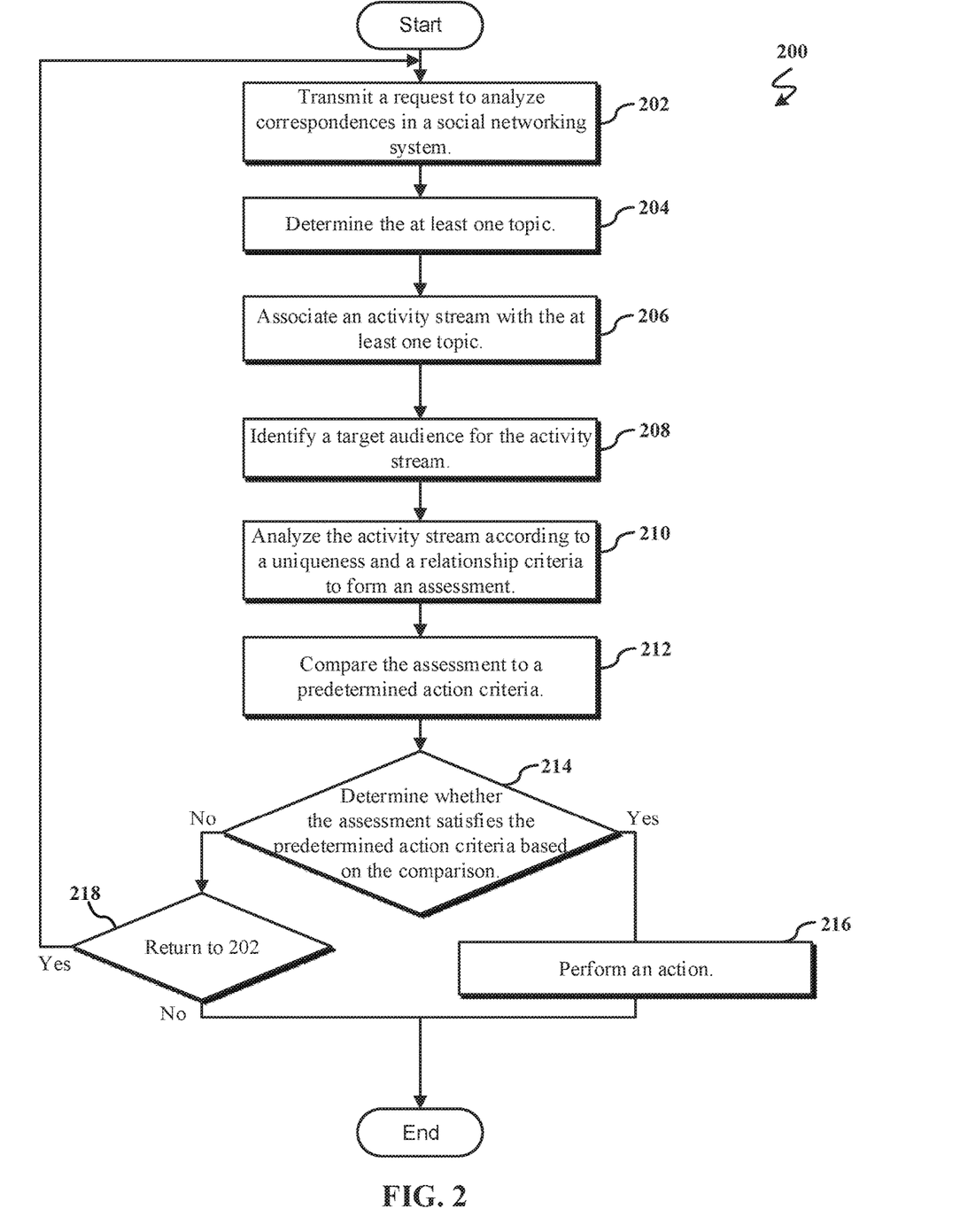
FIG. 2 illustrates an operational flowchart illustrating an example pruning process by a dynamic pruning program according to at least one embodiment.

Referring now to FIG. 2, an operational flowchart illustrating the exemplary pruning process 200 (e.g., executed by the dynamic pruning program 110a and 110b shown in FIG. 1) according to at least one embodiment is depicted. At 202, the dynamic pruning program 110a and 110b (FIG. 1) transmits a request to analyze correspondences in a social networking system to determine at least one topic. The request to analyze correspondences in a social networking system to determine at least one topic may activate the dynamic pruning program 110a and 110b (FIG. 1). The request may have been an automatic setting made by the user as an option within the dynamic pruning program 110a and 110b (FIG. 1). For example, the dynamic pruning program 110a and 110b (FIG. 1) may have an option to automatically transmit the request when correspondence(s) associated with the social networking system satisfies a threshold (e.g., an inbox associated with a user of the social networking system contains more than five thousand messages). The dynamic pruning program 110a and 110b (FIG. 1) may display the request within a user interface (UI).

At 204, the dynamic pruning program 110a and 110b (FIG. 1) determines the at least one topic. The at least one topic may be one or messages or electronic documents that each may include attribute within text. The dynamic pruning program 110a and 110b (FIG. 1) may determine the at least one topic by requesting a user to select the at least one topic using a generated list compiled by the dynamic pruning program 110a and 110b (FIG. 1) that may be displayed within the UI. The at least one topic may be a set of messages selected by the user as anchor points for analysis. The displayed list may be all correspondence within the social networking system, and the user may select a predetermined amount of messages (e.g., one hundred messages) from the social networking system that the user may define as important or include content (e.g., events, projects, subject material, confidential information, etc.) that he thinks is important. The at least one determined topic may be at least a single message selected by the user, up to a predefined threshold (e.g., 5 messages or 5,000 messages), or the user may select as many messages as he wishes. The dynamic pruning program 110a and 110b (FIG. 1) may also automatically determine the at least one topic based on historical data that includes previous selections by the user. The dynamic pruning program 110a and 110b (FIG. 1) may utilize analytical software techniques commonly known in the art to generate the list of messages, or to determine the at least one topic. In some embodiments, the dynamic pruning program 110a and 110b (FIG. 1) may automatically select the at least one topic from a last hour, week, month, and/or year of activity within the social networking system, or may be selected based on a user's frequently used search terms or topics.

Next, at 206, the dynamic pruning program 110a and 110b (FIG. 1) associates an activity stream with the at least one determined topic. For example, if the at least one determined topic is a message within an inbox of a social networking system, then the activity stream may be an aggregate of the remaining messages within the inbox. The activity stream may be an aggregate of all correspondence within the social networking system, or any text written or displayed within a user profile of the social networking system. For example, the activity stream may be an aggregate of all messages (inbox, sent, spam, drafting, trash, etc.) associated with the social networking system, and may also be any text or messages associated with a second social networking system that is also associated with the social networking system.

Then, at 208, the dynamic pruning program 110a and 110b (FIG. 1) identifies a target audience for the activity stream. The target audience may be correspondence within the social networking system with substantially similar or related content as the at least one determined topic. For example, the target audience may have the same sender or receiver of a selected message, or include events or projects that are included in the at least one determined topic. The dynamic pruning program 110a and 110b (FIG. 1) may identify the target audience by parsing the at least one determined topic (e.g., the user selected messages), then generate corresponding data structures for one or more portions of the user selected messages. For example, the dynamic pruning program 110a and 110b (FIG. 1) may output parsed text elements from the user selected messages as data structures. Additionally, a parsed text element may be represented in the form of a parse tree or other graph structure. The dynamic pruning program 110a and 110b (FIG. 1) may also parse audio and video recordings within the user selected messages. The target audience may be any messages within an inbox of a social networking system that includes the parsed text elements or keywords that are associated with keywords or parsed text elements of the at least one determined topic.

Additionally, the dynamic pruning program 110a and 110b (FIG. 1) may generate then extract a correspondence identification from the at least one determined topic, then query a data repository (e.g., database 114) for all the text elements related to the conversation identification. The dynamic pruning program 110a and 110b (FIG. 1) may link correspondence text elements based on substantially similar attributes. The dynamic pruning program 110a and 110b (FIG. 1) may create a synthetic message representing one or more users, addresses, key terms, n-grams, natural language, and metadata. The synthetic message may be a message compiled by the dynamic pruning program 110a and 110b (FIG. 1) that includes keywords and attributes of the at least one determined topic. The dynamic pruning program 110a and 110b (FIG. 1) may extract data from within the synthetic message using natural language processing and field access via application program interface (API) to the synthetic message, and may ignore signatures or greetings within the activity stream when processing the natural language. The dynamic pruning program 110a and 110b (FIG. 1) may keep a synthetic element of the synthetic message, such as {"conversation": {subject: Fred's Retirement, users: {fred, bob, alice, charlie}}}. Additionally, the dynamic pruning program 110a and 110b (FIG. 1) may ignore key terms or attributes (e.g., tea, finance, etc.); and, may also decay the importance of specific terms (e.g. tea is never important, or finance is only important for a finite time); and, may ignore repeated messages or words, such as the words "thanks" and/or "hello," or duplicate messages. The dynamic pruning program 110a and 110b (FIG. 1) may ignore terms, or messages, and then store those matching messages in a separate data repository.

According to at least one embodiment, the dynamic pruning program 110a and 110b (FIG. 1) may be or include a natural language processing system capable of executing entity resolution techniques that may be helpful in identifying important entities within the user selected messages. Entity resolution techniques may identify concepts and keywords within a user selected message. Once entities have been identified, correlations and linguistic links between entities may be detected and used to establish relevance of the entities and, ultimately, the context of the user selected messages. An example technique that may be useful in determining the relative importance of a given entity to the context of the passage is inverse document frequency, which utilizes the relative commonality of the entity as an indicator of its importance to evaluating context. Many other techniques may also be used. These same techniques may be useful for determining the main idea or critical words of the user selected messages and then identifying a target audience (e.g., remaining messages within the activity stream that include a substantially similar main idea or keyword).

The text elements may be any words in the form of text, audio, or video that appears more than once or have a relative importance to the user selected messages (e.g., the message date, title, sender, receiver, and/or frequently used words). The text elements may be a concept within the text of the user selected messages or within an audio and video recording within the user selected messages. The parsed text elements or keywords of the user selected messages may be included more than once and may be a different font (e.g., larger than other words within the user selected messages) or presented in a different manner than other words within the user selected messages (e.g., bolded or in italics). Additionally, the text element and/or keywords may be listed in a table for visual view to the end user. The table may be ordered based on user pre-configuration (e.g., most important to least important).

According to some embodiments, the dynamic pruning program 110a and 110b (FIG. 1) may generate a knowledge graph for the user selected messages. The knowledge graph may have the same or similar characteristics and/or appearance as the knowledge graph that will be discussed in reference to FIG. 3. For example, the knowledge graph may include a plurality of nodes and edges. The nodes may relate to concepts found in the user selected messages, such as keywords, message titles, and/or who is receiving/transmitting the correspondence. The nodes may be linked together with edges to represent a connection between the nodes. The knowledge graph will be discussed in further detail with reference to FIG. 3.

Then, at 210, the dynamic pruning program 110a and 110b (FIG. 1) analyzes the activity stream according to a uniqueness (e.g., a generated numerical value) and a relationship criteria to form an assessment. The uniqueness may be associated with links of the knowledge graph that connect two nodes. The links may have a metric "distance" that may define the uniqueness (e.g., quantity of connections) and the relationship (e.g., the type of connection) between two nodes that are connected by the link. The types of connections may be based on generation (e.g., a measure of relatedness), conversation subject, natural language, and/or addressees. The relationship criteria between any two nodes may be based on an elapsed time between the nodes (e.g., frequency of correspondence or date since last correspondence), a community distinction (e.g., a member of a rock climbing community communicating with a member of a skydiving community), and/or a social relationship between the target audience and the at least one determined topic (e.g., correspondence between a manager and an assistant). The dynamic pruning program 110a and 110b (FIG. 1) may analyze the activity stream in multiple iterations, each iteration analyzing the activity stream according to a disparate synthetic message that includes one or more key terms related to the at least one determined topic. The assessment may be in the form of a grouped activity stream that includes the selected messages, target audience, and the remaining messages that are organized into four groups: a first generation (i.e., the at least one determined topic); a second generation (i.e., the target audience); a third generation (i.e., a target audience of the target audience) that may be messages that may include substantially similar content as the target audience; and, an orphan generation that may be remaining messages of the activity stream (i.e., unlinked messages within the knowledge graph) which are neither the at least one determined topic (e.g., user selected messages) nor the target audience. The first generation, second generation, and third generation may all be stored in a same data repository (e.g., database 114) or in disparate data repositories, or some combination thereof. In some embodiments, the dynamic pruning program 110a and 110b (FIG. 1) may establish a data management policy that may comply with the following conditions: the third generation is stored on a tape, the second generation is stored on a disk, and the first generation may be stored in a solid-state drive, or some combination thereof.

The dynamic pruning program 110a and 110b (FIG. 1) may, in part, form the assessment by weighting links (e.g., each link has a weight of one) of the knowledge graph, as well as parsed text elements and/or keywords within the at least one determined topic and/or target audience. Weighting may occur in instances when there are multiple identified text elements and/or keywords that are not relevant but appear multiple times within the target audience. For example, if the unrelated text elements and/or keywords are "surf" and "skyscraper," and the unrelated determined topics appear multiple times throughout the user selected messages, each unrelated determined topic may be weighted to determine which topic more accurately describes the content of the correspondence and/or target audience within the social networking system for pruning. The dynamic pruning program 110a and 110b (FIG. 1) may weight each text element and/or keyword according to the number of appearances within the user selected messages or according to the location within the user selected messages (e.g., in the title). The value of the weights given to the text elements and/or keywords may be adjusted by the user or automatically by the dynamic pruning program 110a and 110b (FIG. 1).

Then, at 212, the dynamic pruning program 110a and 110b (FIG. 1) compares the assessment to a predetermined action criteria. The predetermined action criteria may be a user defined policy or an automated policy implemented by dynamic pruning program 110a and 110b (FIG. 1) that prunes a portion of the activity stream according to a particular generation. For example, the predetermined action criteria may prune any correspondence that is more than two generations (i.e., prune the third generation, and orphan generation); prune all generations besides the first generation; or prune the orphan generation, and store the third generation to a solid-state drive or tape; or, prune and then store all generations besides the first generation to separate data repositories. In some embodiments, the dynamic pruning program 110a and 110b (FIG. 1) may determine the action criteria after no selection has occurred for a predefined amount of time (e.g., five minutes).

Then, at 214, the dynamic pruning program 110a and 110b (FIG. 1) determines whether the assessment satisfies the predetermined action criteria based on the comparison. If the dynamic pruning program 110a and 110b (FIG. 1) determines the assessment satisfies the predetermined action criteria based on the comparison (214, "YES" branch), the pruning process 200 may perform an action at 216. If the dynamic pruning program 110a and 110b (FIG. 1) determines the assessment does not satisfy the predetermined action criteria based on the comparison (214, "NO" branch), the pruning process 200 may continue to receive a user selection at 218.

If the dynamic pruning program 110a and 110b (FIG. 1) determines the assessment satisfies the predetermined action criteria based on the comparison, then, at 216, the dynamic pruning program 110a and 110b (FIG. 1) performs an action. The dynamic pruning program 110a and 110b (FIG. 1) may prune each message that does not satisfy the assessment. For example, the dynamic pruning program 110a and 110b (FIG. 1) may prune the messages with zero linkage with other messages (i.e., orphan generation messages), or weak links (i.e., third generation messages). The user may preconfigure the dynamic pruning program 110a and 110b (FIG. 1) to display the messages to be pruned so that the user may determine if any messages should not be deleted. The dynamic pruning program 110a and 110b (FIG. 1) may also store backup copies of any pruned messages according to the management policy. Alternatively, the performed action may include presenting an organizational update of the activity stream (e.g., a merging, a separation, or an archive). The merging may include grouping substantially similar correspondence into one or more folders within the social networking system based on the generation of the correspondence. The separation may include separating correspondences that includes disparate content into one or more folders based on the content or the generation of the correspondence. The archiving may include storing correspondence into one or more databases (e.g., database 114) based on the content or the generation of the correspondence. Once the dynamic pruning program 110a and 110b (FIG. 1) performs an action, the pruning process 200 may terminate.

However, if the dynamic pruning program 110a and 110b (FIG. 1) determines the assessment does not satisfy the predetermined action criteria based on the comparison, then, at 218, the dynamic pruning program 110a and 110b (FIG. 1) displays a selection for the user to return to 202. If the dynamic pruning program 110a and 110b (FIG. 1) receives a selection from the user to return to 202 (218, "YES" branch), the pruning process 200 may return to 202. If the dynamic pruning program 110a and 110b (FIG. 1) receives a selection from the user to not return to 202, (218, "NO" branch), the pruning process 200 may terminate.

According to at least one embodiment, the dynamic pruning program 110a and 110b (FIG. 1) may selectively ignore messages (e.g., all messages from management, all messages with the word tea or bank, and/or all payroll stubs) based on historical data, and may also ignore messages which need to follow a message retention policy (e.g., legal messages). The dynamic pruning program 110a and 110b (FIG. 1) may establish a minimum retention policy for a message that is identified as an orphan generation, and then may present a report of the orphaned messages, and the date at which the orphaned generations are to be removed. The dynamic pruning program 110a and 110b (FIG. 1) may predict that a message is going to be an orphan generation due to the reduction in the links/strengths of the links between nodes of the knowledge graph, discussed more with reference to FIG. 3. The dynamic pruning program 110a and 110b (FIG. 1) may monitor search terms to record matches between the terms and possible orphaned data. The dynamic pruning program 110a and 110b (FIG. 1) may include linked data such as files, wikis, blogs, and/or activity streams. As previously discussed, activity streams may include files, wikis, blogs, email correspondence, and any other text and/or correspondence associated with a social networking system. The dynamic pruning program 110a and 110b (FIG. 1) may store results from prior analysis to reduce repeated calculation.

According to at least one embodiment, a user may select one or more emails within a social networking system to store. A processor may identify key terms/concepts within the one or more user selected message using NLP. The processor may weigh the key terms/concepts according to importance (e.g., number of times the email was used, where the email was used, similar subject of email, and/or sender of the email). The processor may score each unselected email according to the overlap of key concepts (i.e., the number of times the key concepts are in each unselected email). The processor may rank the unselected emails. The processor may allow user (or automatically) to prune the set of unselected emails according to their score and the maximum number of messages allowed.

Figure 3:
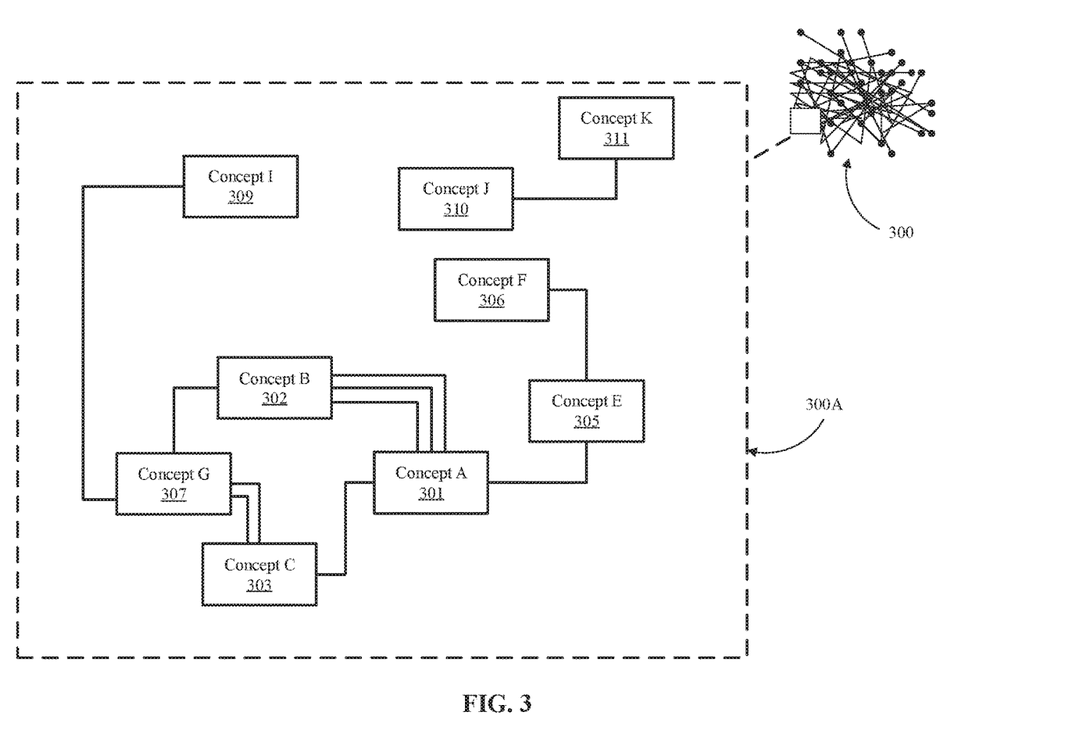
FIG. 3 illustrates a close-up view of a portion of an exemplary knowledge graph for the at least one determined topic and the remaining correspondence within a social networking system according to at least one embodiment.

FIG. 3 illustrates a close-up view of a portion 300A of an exemplary knowledge graph 300 for the at least one determined topic and the remaining correspondence within a social networking system, in accordance with embodiments of the present disclosure. The close-up view of the portion 300A includes eleven nodes 301-311, with each node representing a different concept. For example, a node may represent a title, addressee, event, key word, and/or main idea of a parsed correspondence according to a uniqueness and a relationship criteria. For example, a node may represent an at least one determined topic, or a correspondence within the activity stream. The nodes 301-311 are connected by edges that represent connections between the correspondences. For example, if two connected correspondences correspond to an event or an ongoing project, an edge connecting them may represent a link for the event or the project. There may be two links connecting them, a first link representing the event, and a second link representing the project. The dynamic pruning program 110a and 110b (FIG. 1) may generate the knowledge graph 300 using known natural language processing techniques. The illustrated portion 300A of the knowledge graph 300 is an undirected part of the knowledge graph, meaning that the edges shown represent symmetric relations between the concepts. If, however, an edge presented a different relationship, the edge may be a directed edge.

The number of edges connecting two concepts may correspond to a level of relatedness between the concepts. For example, concept A 301, which may correspond to an at least one determined topic (e.g., a first message), and concept B 302, which may correspond to a correspondence within the activity stream (e.g., a second message), are connected with three edges, whereas concept A 301 is connected to concept E 305, which may correspond to a similar sender of correspondence, by a single edge. This may indicate that concept A 301 and concept B 302 are more closely related than concept A 301 and concept E 305. As an additional example, concept C 303 may correspond to correspondence within an inbox folder (e.g., the activity stream) and concept G 307 may correspond to correspondence within a sent folder (e.g., the activity stream), and are connected with two edges. The two edges between concept C 303 and concept G 307 may represent a title of a message and a key term. The dynamic pruning program 110a and 110b (FIG. 1) may assign a numerical value for two concepts based on the number of edges connecting the two concepts together.

The numerical value may also consider the relatedness of concepts that, while not directly connected to each other in the knowledge graph 300, are each connected to the same concept. The dynamic pruning program 110a and 110b (FIG. 1) may look at whether an event or key term linking two edges can be taken through other concepts to connect the two concepts. For example, an event can be drawn to connect concept A 301 and concept F 306 by going through concept E 305, which may correspond to a project that is included in both concept A 310 and concept F 306. The length of the path may be considered when determining a numerical value (i.e., uniqueness and a relationship criteria) between two concepts. For example, the numerical value may be based on the degrees of separation between concepts. Two concepts that are linked together (e.g., concept A 301 and concept B 302) may have 1 degree of separation, whereas two concepts that are not linked together but are both linked to a third concept (e.g., concept A 301 and concept F 306) may have 2 degrees of separation, for example. Additionally, the numerical value can be inversely related to the number of degrees of separation.

The dynamic pruning program 110a and 110b (FIG. 1) may also consider the number of other concepts that the two concepts are connected to in determining a numerical value. For example, concept G 307 is not connected by an edge to concept A 301. However, concept G 307 and concept A 301 are both connected to concepts C 303 and B 302. The dynamic pruning program 110a and 110b (FIG. 1) may determine that, despite not being directly connected, concepts G 307 and A 301 are somewhat related. Accordingly, the numerical value between concepts G 307 and A 301 may be higher than the numerical value between concept A 301 and concept I 309, which are distantly connected to each other, or than concept A 301 and concept K 311, which cannot be connected.

The illustrated portion 300A of the knowledge graph 300 has two connected components. A connected component of an undirected graph includes a subgraph in which any two nodes in the subgraph are connected to each other by paths (including paths through other nodes), but cannot be connected to at least one other node in the graph. For example, concept K 311 and concept J 310 are connected to each other, but no path exists in the illustrated portion 300A of the knowledge graph 300 that can connect either concept K 311 or concept J 310 to concept I 309. Likewise, any two nodes that represent concepts A through I 301-309 can be connected to each other by at least one path, but none of the nodes representing concepts A through I 301-309 can be connected to either concept J 310 or concept K 311. Because there are two subgraphs that satisfy this criteria, the illustrated portion 300A of the knowledge graph 300 includes two connected components.

The knowledge graph 300 (or a portion thereof) may have an isolated node (i.e., an orphan generation). An isolated node includes a node relating to a concept that does not connect to any other nodes through an edge. Isolated nodes (i.e., an orphan generation) may be particularly likely to exist in knowledge graphs generated for correspondences (e.g., at least one determined topic, message of the activity stream, and/or synthetic message) mentioned only briefly (e.g., in a single message). An isolated node is a type of connected component.

The nodes 301-311 may be generated using "fuzzy logic" and/or concept matching, which may be done to ensure that different words or phrases relating to the same concept are included in a single node (e.g., if an event's title changes throughout an activity stream). Fuzzy logic is a technique that may represent different representations of an event or concept as a same entity. For example, the at least one determined topic may refer to an event's "title," "Ceremony," and "Banquet" at different points. The dynamic pruning program 110a and 110b (FIG. 1) using natural language processing techniques and fuzzy logic may determine that all three words refer to the same concept. Accordingly, all three terms may be represented in the knowledge graph using a single node and any edges between any of the three terms and other concepts may connect to that node.

The nodes 301-311 can be weighted according to their importance. This may be represented in the knowledge graph 300 by making the nodes 301-311 larger or smaller. The nodes 301-311 may be weighted according to the number of edges that connect to the nodes. The nodes 301-311 may be weighted according to the importance of the associated concept. For example, correspondences within the activity stream that include an important project may be weighted more than concepts relating to events (e.g., lunch and/or party). Also, at least one topic previously used by the user may be weighted more heavily.

One or more of the nodes 301-311 may be considered potentially important nodes. This may be represented in the knowledge graph by making the potentially important nodes larger, smaller, or boldface type. A node may be a potentially important node if it has a high number of edges connecting to it. For example, the dynamic pruning program 110a and 110b (FIG. 1) may determine that a node is a potentially important node by comparing the number of edges connected to the node to an important node threshold. The important node threshold may be configured by a user. The important node threshold may be determined by the dynamic pruning program 110a and 110b (FIG. 1) based on the number of edges connected to each node. For example, the dynamic pruning program 110a and 110b (FIG. 1) may determine that 10% of nodes in the knowledge graph have more than 20 edges connected to them. Accordingly, the dynamic pruning program 110a and 110b (FIG. 1) may set the important node threshold at 20 edges. Therefore, any node with more than 20 connected edges may be considered a potentially important node.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
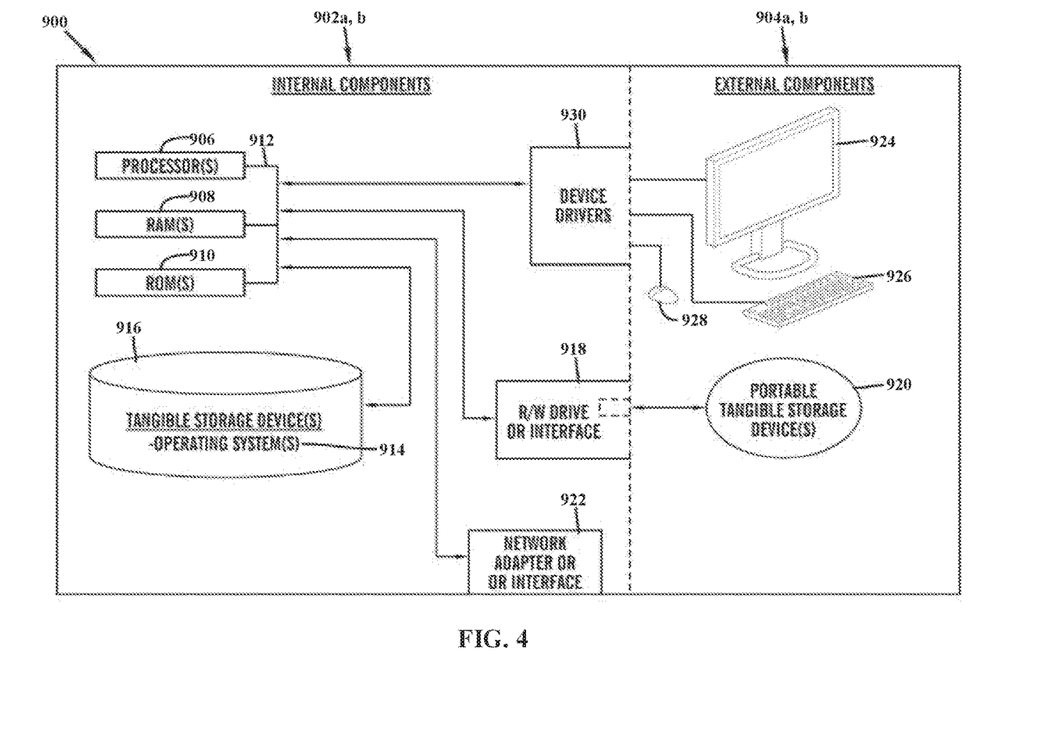
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902a, b, and 904, b is representative of any electronic device capable of executing machine-readable program instructions. Data processing system 902a, b, and 904, b may be representative of a smart phone, a computer system, PDA, or other electronic devices. Examples of computing systems, environments, and/or configurations that may represented by data processing system 902 a, b, and, 904a, b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the dynamic pruning program 110a (FIG. 1) in client computer 102 (FIG. 1) and the dynamic pruning program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the dynamic pruning program 110*a* and 110*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the dynamic pruning program 110*a* (FIG. 1) in client computer 102 (FIG. 1) and the dynamic pruning program 110*b* (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the dynamic pruning program 110*a* (FIG. 1) in client computer 102 (FIG. 1) and the dynamic pruning program 110*b* (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in tangible storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
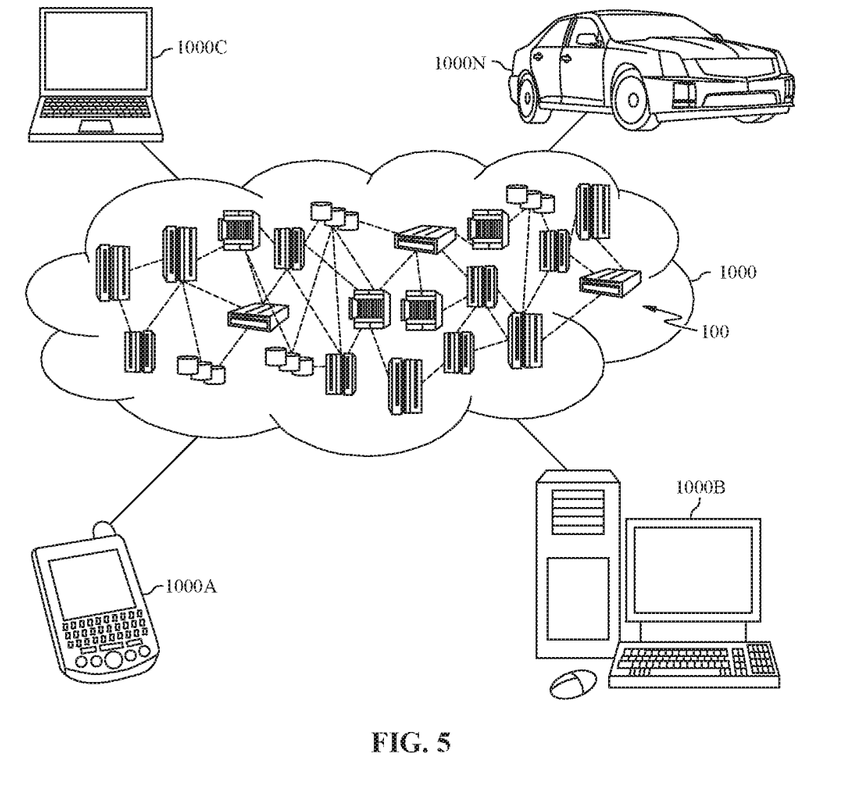
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
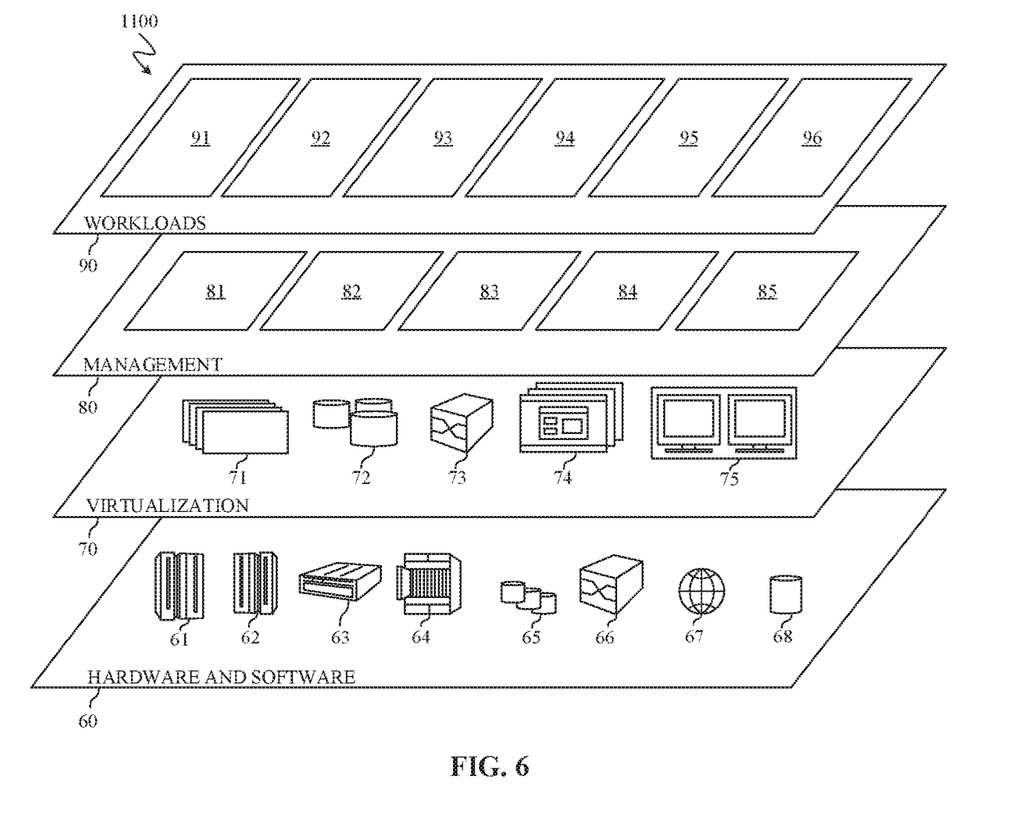
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic pruning 96.

Figure 7:
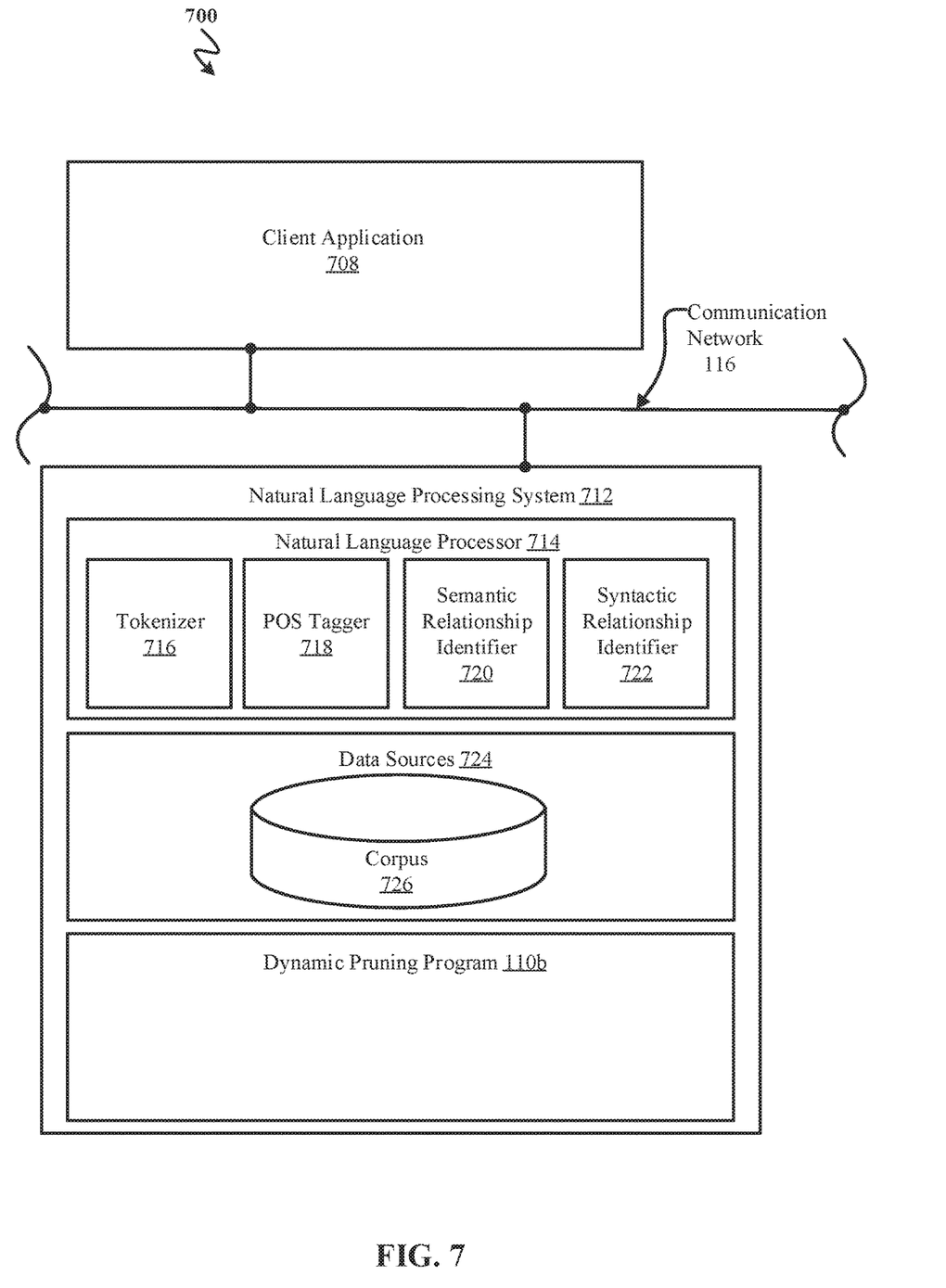
FIG. 7 illustrates a block diagram of an example natural language processing system configured to analyze content within a social networking system, in accordance with embodiments of the present disclosure.

Referring now to FIG. 7, shown is a block diagram of an exemplary system architecture 700, including a dynamic pruning program 110b and a natural language processing system 712, configured to analyze the at least one determined topic or other electronic communication to identify content and to generate related information based on attributes of the at least one determined topic, in accordance with embodiments of the present disclosure. In some embodiments, a remote device may submit electronic documents (such as electronic messages of the social networking system) to be analyzed to the natural language processing system 712 which may be housed on a host device. In some embodiments, a second remote device may submit other electronic content (such as content displayed on a social networking system) to be analyzed to the natural language processing system 712. Such remote devices may each include a client application 708, which may itself involve one or more entities operable to generate or modify content from a social networking system or other electronic communication that is then dispatched to a natural language processing system 712 via a network 116.

Consistent with various embodiments, the natural language processing system 712 may respond to content submissions sent by a client application 708. Specifically, the natural language processing system 712 may analyze a received content from a social networking system or other received electronic communication content to identify characteristics about the received content (e.g., keywords, events, projects, and/or titles of messages). In some embodiments, the natural language processing system 712 may include a natural language processor 714, and data sources 724. The natural language processor 714 may be a computer module that analyzes the received content. The natural language processor 714 may perform various methods and techniques for analyzing the received content (e.g., syntactic analysis, semantic analysis, etc.). The natural language processor 714 may be configured to recognize and analyze any number of natural languages. In some embodiments, the natural language processor 714 may parse passages of the received content. Further, the natural language processor 714 may include various modules to perform analyses of electronic documents. These modules may include, but are not limited to, a tokenizer 716, a part-of-speech (POS) tagger 718, a semantic relationship identifier 720, and a syntactic relationship identifier 722.

In some embodiments, the tokenizer 716 may be a computer module that performs lexical analysis. The tokenizer 716 may convert a sequence of characters into a sequence of tokens. A token may be a string of characters included in written passage and categorized as a meaningful symbol. Further, in some embodiments, the tokenizer 716 may identify word boundaries in content and break any text passages within the content into their component text elements, such as words, multiword tokens, numbers, and punctuation marks. In some embodiments, the tokenizer 716 may receive a string of characters, identify the lexemes in the string, and categorize them into tokens.

Consistent with various embodiments, the POS tagger 718 may be a computer module that marks up a word in passages to correspond to a particular part of speech. The POS tagger 718 may read a passage or other text in natural language and assign a part of speech to each word or other token. The POS tagger 718 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed content (e.g., the content of message may shed light on the meaning of text elements in related message, or content of a first message by a user on an social networking system may shed light on meaning of text elements of a second message by that user on the same or different social networking system). Examples of parts of speech that may be assigned to words include, but are not limited to, nouns, verbs, adjectives, adverbs, and the like. Examples of other part of speech categories that POS tagger 718 may assign include, but are not limited to, comparative or superlative adverbs, wh-adverbs, conjunctions, determiners, negative particles, possessive markers, prepositions, wh-pronouns, and the like. In some embodiments, the POS tagger 718 may tag or otherwise annotate tokens of a passage with part of speech categories. In some embodiments, the POS tagger 718 may tag tokens or words of a passage to be parsed by the natural language processing system 712.

In some embodiments, the semantic relationship identifier 720 may be a computer module that may be configured to identify semantic relationships of recognized text elements (e.g., words, phrases) in received content. In some embodiments, the semantic relationship identifier 720 may determine functional dependencies between entities and other semantic relationships.

Consistent with various embodiments, the syntactic relationship identifier 722 may be a computer module that may be configured to identify syntactic relationships in a passage composed of tokens. The syntactic relationship identifier 722 may determine the grammatical structure of sentences such as, for example, which groups of words are associated as phrases and which word is the subject or object of a verb. The syntactic relationship identifier 722 may conform to formal grammar.

In some embodiments, the natural language processor 714 may be a computer module that may parse received content and generate corresponding data structures for one or more portions of the received content. For example, in response to receiving correspondence from a social networking system at the natural language processing system 712, the natural language processor 714 may output parsed text elements from the correspondence as data structures. In some embodiments, a parsed text element may be represented in the form of a parse tree or other graph structure. To generate the parsed text element, the natural language processor 714 may trigger computer modules 716-722.

In some embodiments, the output of natural language processor 714 (e.g., ingested content) may be stored within data sources 724, such as corpus 726. As used herein, a corpus may refer to one or more data sources, such as the data sources 724 of FIG. 7. In some embodiments, the data sources 724 may include data warehouses, corpora, data models, and document repositories. In some embodiments, the corpus 726 may be a relational database.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically processing information in an activity stream based on a uniqueness and a relationship criteria comprising:
analyzing correspondences in a social networking system to determine at least one message;
associating an activity stream with the at least one determined message;
establishing generation links with the at least one message to remaining messages within the activity stream;
analyzing the activity stream according to a uniqueness and a relationship criteria to form an assessment, wherein the uniqueness is associated with the generation links, and wherein the assessment is in the form of a grouped activity stream, the analyzing the activity stream further comprising:
generating a knowledge graph based on the at least one determined message and the associated activity stream, wherein the knowledge graph includes a first plurality of nodes representing a first plurality of content and a second plurality of nodes representing a second plurality of content, wherein edges between the first plurality of nodes and the second plurality of nodes represent links between the first plurality of content and the second plurality of content; and
calculating a uniqueness score that is the numerical value for each node in the second plurality of nodes based on a number of edges between the first plurality of nodes and the second plurality of nodes, and further according to the uniqueness and the relationship criteria, wherein the first plurality of nodes is the at least one determined message and the second plurality of nodes is unselected messages;
comparing the assessment to a predetermined action criteria; and
performing an action in response to determining the assessment satisfies the predetermined action criteria, wherein the performed action is removing a portion of the activity stream from the social networking system.

2. The method of claim 1, further comprising:
identifying a target audience for the activity stream.

3. The method of claim 2, wherein the grouped activity stream includes selected messages, the target audience, and the remaining messages organized into generations.

4. The method of claim 3, wherein the predetermined action criteria is an automated policy that prunes a portion of the activity stream according to a particular generation from the generations.

5. The method of claim 1, wherein the performed action comprises presenting an organizational update of the activity stream.

6. The method of claim 5, wherein the organizational update of the activity stream is selected from a group consisting of archiving, merging, removing, and separating a portion of the activity stream.

7. A computer system having one or more computer processors, the computer system configured to perform operations comprising:
analyzing correspondences in a social networking system to determine at least one message;
associating an activity stream with the at least one determined message;
establishing generation links with the at least one message to remaining messages within the activity stream;
analyzing the activity stream according to a uniqueness and a relationship criteria to form an assessment, wherein the uniqueness is associated with the generation links, and wherein the assessment is in the form of a grouped activity stream, the analyzing the activity stream further comprising:
generating a knowledge graph based on the at least one determined message and the associated activity stream, wherein the knowledge graph includes a first plurality of nodes representing a first plurality of content and a second plurality of nodes representing a second plurality of content, wherein edges between the first plurality of nodes and the second plurality of nodes represent links between the first plurality of content and the second plurality of content; and
calculating a uniqueness score that is the numerical value for each node in the second plurality of nodes based on a number of edges between the first plurality of nodes and the second plurality of nodes, and further according to the uniqueness and the relationship criteria, wherein the first plurality of nodes is the at least one determined message and the second plurality of nodes is unselected messages;
comparing the assessment to a predetermined action criteria; and
performing an action in response to determining the assessment satisfies the predetermined action criteria, wherein the performed action is removing a portion of the activity stream from the social networking system.

8. The computer system of claim 7, wherein the grouped activity stream includes selected messages, a target audience, and the remaining messages organized into generations.

9. The computer system of claim 8, wherein the predetermined action criteria is an automated policy that prunes a portion of the activity stream according to a particular generation from the generations.

10. The computer system of claim 7, wherein the performed action is presenting an organizational update of the activity stream.

11. A computer program product comprising a non-transitory computer readable storage medium having program instructions embodied therewith, the program instructions executable by a server to cause the server to perform a method, the method comprising:
analyzing correspondences in a social networking system to determine at least one message;
associating an activity stream with the at least one determined message;
establishing generation links with the at least one message to remaining messages within the activity stream;
analyzing the activity stream according to a uniqueness and a relationship criteria to form an assessment, wherein the uniqueness is associated with the generation links, and wherein the assessment is in the form of a grouped activity stream, the analyzing the activity stream further comprising:
generating a knowledge graph based on the at least one determined message and the associated activity stream, wherein the knowledge graph includes a first plurality of nodes representing a first plurality of content and a second plurality of nodes representing a second plurality of content, wherein edges between the first plurality of nodes and the second plurality of nodes represent links between the first plurality of content and the second plurality of content; and
calculating a uniqueness score that is the numerical value for each node in the second plurality of nodes based on a number of edges between the first plurality of nodes and the second plurality of nodes, and further according to the uniqueness and the relationship criteria, wherein the first plurality of nodes is the at least one determined message and the second plurality of nodes is unselected messages
comparing the assessment to a predetermined action criteria; and
performing an action in response to determining the assessment satisfies the predetermined action criteria, wherein the performed action is removing a portion of the activity stream from the social networking system.

12. The computer program product of claim 11, wherein the grouped activity stream includes selected messages, a target audience, and the remaining messages organized into generations.

13. The computer program product of claim 12, wherein the predetermined action criteria is an automated policy that prunes a portion of the activity stream according to a particular generation from the generations.

14. The computer program product of claim 11, wherein the performed action is presenting an organizational update of the activity stream selected from a group consisting of archiving, merging, removing, and separating a portion of the activity stream.

* * * * *